US012674499B2

(12) United States Patent
Higuma et al.

(10) Patent No.: US 12,674,499 B2
(45) Date of Patent: Jul. 7, 2026

(54) JOINED BODY, METHOD OF MANUFACTURING JOINED BODY, AND SHOCK ABSORBER

(71) Applicant: Hitachi Astemo, Ltd., Hitachinaka (JP)

(72) Inventors: Masato Higuma, Hitachinaka (JP); Atsushi Koshizaka, Hitachinaka (JP); Keiji Kawahara, Hitachinaka (JP); Yu Ishimaru, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 384 days.

(21) Appl. No.: 18/574,518

(22) PCT Filed: Jul. 22, 2022

(86) PCT No.: PCT/JP2022/028430
§ 371 (c)(1),
(2) Date: Dec. 27, 2023

(87) PCT Pub. No.: WO2023/017722
PCT Pub. Date: Feb. 16, 2023

(65) Prior Publication Data
US 2024/0318701 A1 Sep. 26, 2024

(30) Foreign Application Priority Data
Aug. 11, 2021 (JP) ................................. 2021-131258

(51) Int. Cl.
*F16F 9/32* (2006.01)
*F16F 9/19* (2006.01)

(52) U.S. Cl.
CPC .............. *F16F 9/3228* (2013.01); *F16F 9/19* (2013.01); *F16F 9/3271* (2013.01);
(Continued)

(58) Field of Classification Search
CPC .......... F16F 9/19; F16F 9/3228; F16F 9/3271; F16F 9/3221; F16F 2222/12;
(Continued)

(56) References Cited

U.S. PATENT DOCUMENTS

| | | | | |
|---|---|---|---|---|
| 6,501,617 | B1 * | 12/2002 | Harada | B21K 25/00 360/99.08 |
| 7,427,171 | B2 * | 9/2008 | Tokairin | B21D 39/04 220/789 |

(Continued)

FOREIGN PATENT DOCUMENTS

| | | |
|---|---|---|
| JP | 2001-54268 | 2/2001 |
| JP | 2009-202193 | 9/2009 |

OTHER PUBLICATIONS

International Search Report issued Sep. 13, 2022 in International Application No. PCT/JP2022/028430, with English translation.
(Continued)

*Primary Examiner* — Henry Y Liu
(74) *Attorney, Agent, or Firm* — Wenderoth, Lind & Ponack, L.L.P.

(57) ABSTRACT

A first annular groove is filled with a material of a solenoid case and a first joined portion is formed after a second annular groove is filled with the material of the solenoid case and a second joined portion is formed. This allows a load applied to a piston rod when the material of the solenoid case flows into the first annular groove to be partially received by the second joined portion, thereby contributing to reducing a reaction force received by the piston rod and thus preventing the deformation of an upper-end portion of the piston rod due to the reaction force received by the piston rod.

6 Claims, 11 Drawing Sheets

(52) U.S. Cl.
CPC ......... *F16F 9/3221* (2013.01); *F16F 2222/12* (2013.01); *F16F 2226/045* (2013.01); *F16F 2230/0005* (2013.01)

(58) Field of Classification Search
CPC ......... F16F 2226/045; F16F 2230/0005; F16F 9/3207; F16B 17/004; F16B 4/00; B21D 39/04; B21D 39/206; B21D 39/046; B21D 39/048

See application file for complete search history.

(56) References Cited

U.S. PATENT DOCUMENTS

| | | | | |
|---|---|---|---|---|
| 10,655,702 B2 * | 5/2020 | Hamers | .................... | F16F 9/465 |
| 11,015,670 B2 * | 5/2021 | Fritz | ........................ | F16F 9/064 |
| 11,754,206 B2 * | 9/2023 | Flynn | ................. | F16L 37/0985 |
| | | | | 285/81 |
| 11,906,014 B2 * | 2/2024 | Matsumoto | ........... | F16F 9/3207 |
| 12,163,572 B2 * | 12/2024 | Yamashita | ............ | F16F 9/3484 |
| 2005/0067831 A1 * | 3/2005 | Tokairin | ................. | B21D 39/04 |
| | | | | 285/329 |
| 2008/0072654 A1 * | 3/2008 | Nishimura | ............ | F16B 17/004 |
| | | | | 72/372 |
| 2017/0009882 A1 * | 1/2017 | Wunderling | .......... | F16F 9/3228 |
| 2018/0340586 A1 * | 11/2018 | Koba | .................... | F16F 1/3828 |
| 2021/0285585 A1 * | 9/2021 | Flynn | ..................... | B21K 25/00 |
| 2022/0186807 A1 * | 6/2022 | Yamashita | .............. | F16F 9/182 |
| 2022/0252126 A1 * | 8/2022 | Matsumoto | ........... | F16B 17/006 |

OTHER PUBLICATIONS

Written Opinion of the International Searching Authority issued Sep. 13, 2022 in International Application No. PCT/JP2022/028430, with English translation.

* cited by examiner

JOINED BODY, METHOD OF MANUFACTURING JOINED BODY, AND SHOCK ABSORBER

TECHNICAL FIELD

The present invention relates to a joined body joined by plastic flow joining, a method of manufacturing this joined body, and a shock absorber manufactured by this manufacturing method.

BACKGROUND ART

PTL 1 discloses a method of joining two members that joins a one-end portion of a piston rod and a solenoid case by a plastic flow joining method (Metal Flow) (hereinafter referred to as a "conventional joining method").

CITATION LIST

Patent Literature

PTL 1: Japanese Patent Application Laid-Open No. 2009-202193

SUMMARY OF INVENTION

Technical Problem

In the conventional joining method, when the one-end portion of the piston rod (a rod-like member) and the solenoid case (a counterpart member) are joined by the plastic flow joining method, an opposite-end surface of the piston rod is received by a tool. Therefore, a processing force (a pressing force exerted from a die) is applied to the opposite-end surface (a pressure-receiving surface) of the piston rod. Then, in a case where a cable insertion hole is provided in the piston rod, the circumferential edge portion of the opening on the opposite-end side of the piston rod (a pressure-receiving portion) may be deformed due to the processing force.

One of objects of the present invention is to provide a joined body that prevents the deformation of a rod-like member in a plastic flow joining method, a method of manufacturing the joined body, and a shock absorber using them.

Solution to Problem

A joined body according to the present invention is a joined body of two members joined by fitting a one-end portion of a rod-like member into a fitted hole of a counterpart member and pressing a material of the counterpart member to thus cause the material to plastically flow into a groove provided on a circumferential surface of the rod-like member. The groove includes a first groove provided on a one-end side of the rod-like member and a second groove provided so as to be axially spaced apart from the first groove. A depth of the first groove is greater than a depth of the second groove.

A method of manufacturing a joined body according to the present invention is a method of manufacturing a joined body of two members joined by fitting a one-end portion of a rod-like member into a fitted hole of a counterpart member and pressing a material of the counterpart member to thus cause the material to plastically flow into a groove provided on a circumferential surface of the rod-like member. The method of manufacturing the joined body includes a first plastic flow step of causing the material of the counterpart member to plastically flow into a second groove provided at a position spaced apart from one end of the rod-like member, and a second plastic flow step of causing the material of the counterpart member to plastically flow into a first groove provided on a one-end side of the rod-like member.

A shock absorber according to the present invention is a shock absorber including a cylinder sealingly containing hydraulic fluid therein, a piston mechanism partitioning an inside of the cylinder into two chambers, a piston rod having a one-end portion joined with the piston mechanism and an opposite-end portion extending out of the cylinder, and a joined portion formed by fitting the one-end portion of the piston rod into a fitted hole of the piston mechanism and pressing a material of the piston mechanism to thus cause the material to plastically flow into a groove provided on a circumferential surface of the rod-like member. The groove includes a first groove provided on a one-end side of the piston rod and a second groove provided so as to be axially spaced apart from the first groove. A depth of the first groove is greater than a depth of the second groove.

Advantageous Effects of Invention

According to one aspect of the present invention, a pressure-receiving portion of a rod-like member can be prevented from being deformed in the plastic flow joining method.

DESCRIPTION OF EMBODIMENTS (First Embodiment) A first embodiment of the present invention will be described with reference to the attached drawings.

Figure 1:
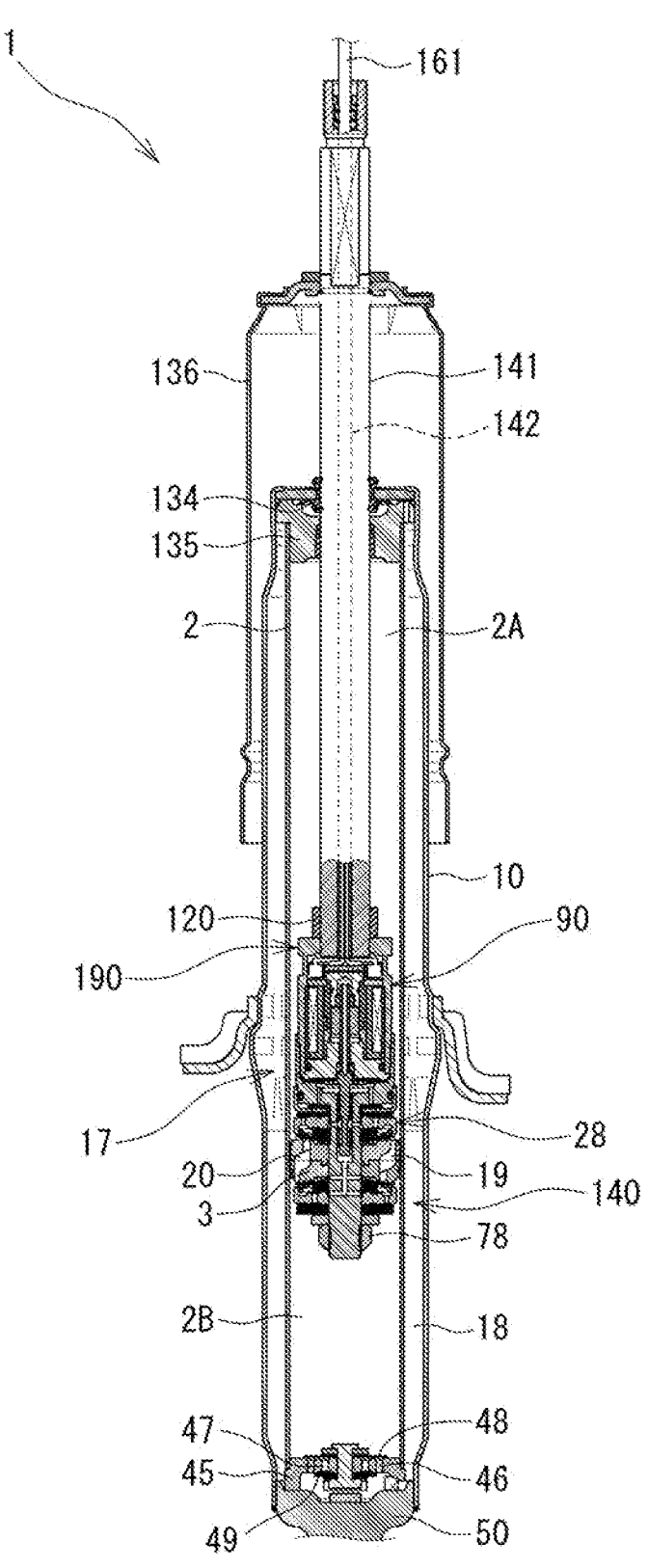
FIG. 1 is a cross-sectional view of a shock absorber according to a first embodiment taken along an axial plane.

For convenience, the vertical direction in FIG. 1 will be referred to as a "vertical direction" herein simply. FIG. 1 illustrates a so-called a built-in piston-type damping force adjustable shock absorber 1 in which a damping force adjustment mechanism 17 is built in a cylinder 2.

As illustrated in FIG. 1, the shock absorber 1 has a twin-tube structure including an outer tube 10 provided outside the cylinder 2. The shock absorber 1 includes a piston mechanism 140 including a piston 3 and the damping force adjustment mechanism 17. The piston 3 is slidably fitted in the cylinder 2, and partitions the inside of the cylinder 2 into two chambers, a cylinder upper chamber 2A (a first chamber) and a cylinder lower chamber 2B (a second chamber). A lower-end portion 145 (a one-end portion) of a piston rod 141 (a rod-like member) is joined to the piston mechanism 140. The opposite-end side (the upper side in FIG. 1) of the piston rod 141 extends out of the cylinder 2.

A reservoir 18 is formed between the cylinder 2 and the outer tube 10. The piston 3 includes an extension-side passage 19 and a compression-side passage 20. The upper-end side of the extension-side passage 19 is opened to the cylinder upper chamber 2A. The lower-end side of the compression-side passage 20 is opened to the cylinder lower chamber 2B. A base valve 45 is provided at the lower-end portion of the cylinder 2. The base valve 45 separates the cylinder lower chamber 2B and the reservoir 18 from each other. Passages 46 and 47 are provided in the base valve 45. The passages 46 and 47 establish communication between the cylinder lower chamber 2B and the reservoir 18.

A check valve 48 is provided on the passage 46. The check valve 48 permits only a flow of the oil fluid (the hydraulic fluid) from the reservoir 18 side toward the cylinder lower chamber 2B side. On the other hand, a disk valve 49 is provided on the passage 47. The disk valve 49 is opened by an increase in the pressure of the oil fluid on the cylinder lower chamber 2B side to a predetermined pressure, and releases the pressure (the oil fluid) on the cylinder lower chamber 2B side toward the reservoir 18 side. Oil fluid is sealingly contained in the cylinder 2 and oil fluid and gas are sealingly contained in the reservoir 18 as the hydraulic fluid. Further, a bottom cap 50 is joined to the lower end of the outer tube 10.

Figure 2:
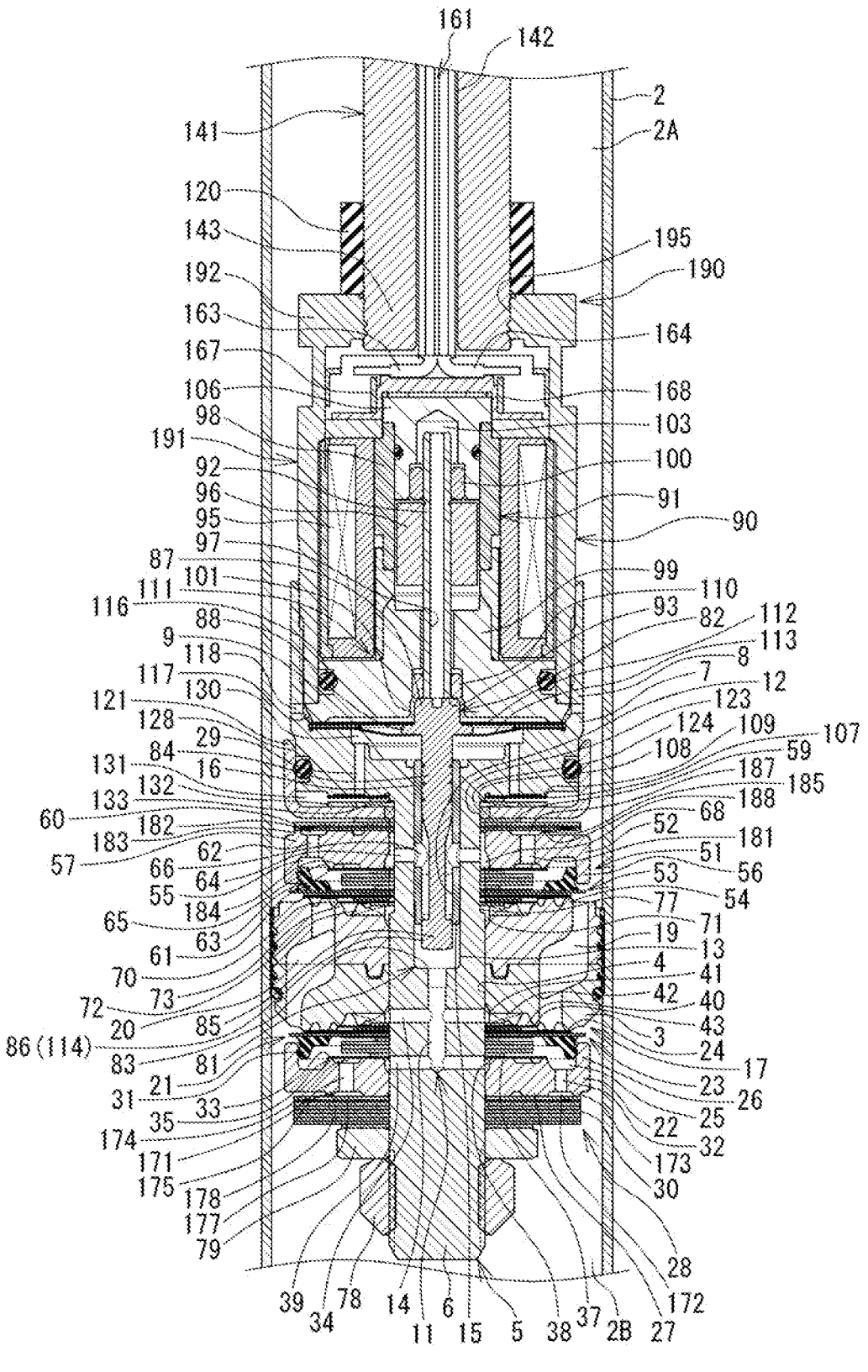
FIG. 2 illustrates a piston mechanism illustrated in FIG. 1 in an enlarged manner.

The damping force adjustment mechanism 17 includes a valve mechanism portion 28 and a solenoid 90. As illustrated in FIG. 2, the valve mechanism portion 28 includes a piston bolt 5, an extension-side valve mechanism 21, and a compression-side valve mechanism 51. A shaft portion 6 of the piston bolt 5 is inserted through an axial hole 4 of the piston 3. The extension-side valve mechanism 21 controls a flow of the hydraulic fluid in the extension-side passage 19. The compression-side valve mechanism 51 controls a flow of the hydraulic fluid in the compression-side passage 20.

The extension-side valve mechanism 21 includes a bottomed cylindrical extension-side pilot case 22 attached to the shaft portion 6 of the piston bolt 5. The extension-side pilot case 22 includes a cylindrical portion 26 opened on the piston 3 side, and a bottom portion 27. An extension-side main valve 23 (a valve member) is disposed on the piston 3 side of the extension-side pilot case 22. Further, an extension-side back-pressure chamber 25 is formed on an opposite piston side (the "lower side" in FIG. 2) of the extension-side main valve 23 and between the extension-side main valve 23 and the extension-side pilot case 22.

The extension-side valve mechanism 21 includes an annular seat portion 24 (a first seat portion). The seat portion 24 is formed on the outer peripheral side of the lower-end surface of the piston 3, and the extension-side main valve 23 is in abutment with the seat portion 24 in a seatable and separable manner. The seat portion 24 is formed on the outer peripheral side with respect to the opening of the extension-side passage 19. The extension-side back-pressure chamber 25 is formed between the extension-side pilot case 22 and the back surface of the extension-side main valve 23. A pressure in the extension-side back-pressure chamber 25 is applied to the extension-side main valve 23 in a valve-closing direction. An annular packing 31 made of an elastic member is baked to the extension-side main valve 23. The extension-side main valve 23 is a packing valve in which the packing 31 is in contact with the inner peripheral surface of the cylindrical portion 26 of the extension-side pilot case 22 along the entire circumference thereof.

The extension-side back-pressure chamber 25 is in communication with the cylinder lower chamber 2B via passages 32 formed in the bottom portion 27 of the extension-side pilot case 22 and a sub valve 30. The sub valve 30 is opened when the pressure in the extension-side back-pressure chamber 25 reaches a predetermined pressure, and applies a resistance force to a flow of the hydraulic fluid directed from the extension-side back-pressure chamber 25 to the cylinder lower chamber 2B.

The extension-side back-pressure chamber 25 is in communication with first pressure-receiving chambers 172 formed between the extension-side pilot case 22 and the sub valve 30 via the passages 32. The first pressure-receiving chambers 172 are each defined in a fan-like form by a plurality of annular first seat portions 173 provided on the lower-end surface of the extension-side pilot case 22 (the surface thereof opposite from the extension-side main valve 23 side). The passages 32 are opened on the inner sides with respect to the plurality of first seat portions 173, respectively.

A back-pressure introduction passage 171 is provided in the extension-side pilot case 22. In the back-pressure introduction passage 171, a flow of the hydraulic fluid from the cylinder lower chamber 2B to the extension-side back-pressure chamber 25 is generated due to a movement of the piston 3 in a compression direction. An annular seat portion 35 is provided on the upper-end surface of the extension-side pilot case 22 (the surface thereof on the extension-side main valve 23 side). The seat portion 35 defines an annular pressure-receiving chamber 174 provided on the outer periphery of the inner peripheral portion of the bottom portion 27.

A second pressure-receiving chamber 177 isolated from the first pressure-receiving chambers 172 is provided on the lower-end surface of the extension-side pilot case 22. The back-pressure introduction passage 171 is opened to the second pressure-receiving chamber 177. The second pressure-receiving chamber 177 is defined by a second seat portion 178. The second seat portion 178 extends in a circular arc form between a pair of adjacent first pressure-receiving chambers 172. A first orifice 175 is provided on the second seat portion 178. The first orifice 175 establishes communication between the second pressure-receiving chamber 177 and the cylinder lower chamber 2B.

Due to this configuration, an extension-side communication passage (a communication passage) establishing communication between the cylinder lower chamber 2B and the extension-side back-pressure chamber 25 is formed in the extension-side valve mechanism 21. Through the extension-side communication passage, the hydraulic fluid in the cylinder lower chamber 2B is introduced into the extension-side back-pressure chamber 25 via the first orifice 175, the second pressure-receiving chamber 177, the back-pressure introduction passage 171, the pressure-receiving chamber 174, and a check valve 33 according to the movement of the piston 3 in the compression direction.

On the other hand, the compression-side valve mechanism 51 includes a bottomed cylindrical compression-side pilot case 52 attached to the shaft portion 6 of the piston bolt 5. The compression-side pilot case 52 includes a cylindrical portion 56 opened on the piston 3 side, and a bottom portion 57. A compression-side main valve 53 (the valve member) is disposed on the piston 3 side of the compression-side pilot case 52. Further, a compression-side back-pressure chamber 55 is formed on an opposite piston side (the "upper side" in FIG. 2) of the compression-side main valve 53 and between the compression-side main valve 53 and the compression-side pilot case 52.

The compression-side valve mechanism 51 includes an annular seat portion 54 (the first seat portion). The seat portion 54 is formed on the outer peripheral side of the upper-end surface of the piston 3, and the compression-side main valve 53 is in abutment with the seat portion 54 in a seatable and separable manner. The seat portion 54 is formed on the outer peripheral side with respect to the opening of the compression-side passage 20. The compression-side back-pressure chamber 55 is formed between the compression-side pilot case 52 and the back surface of the compression-side main valve 53. The pressure in the compression-side back-pressure chamber 55 is applied to the compression-side main valve 53 in a valve-closing direction. An annular packing 61 made of an elastic member is baked to the compression-side main valve 53. The compression-side main valve 53 is a packing valve in which the packing 61 is in contact with the inner peripheral surface of the cylindrical portion 56 of the compression-side pilot case 52 along the entire circumference thereof.

The compression-side back-pressure chamber 55 is in communication with the cylinder upper chamber 2A via passages 62 formed in the bottom portion 57 of the compression-side pilot case 52 and a sub valve 60. The sub valve 60 is opened when the pressure in the compression-side back-pressure chamber 55 reaches a predetermined pressure, and applies a resistance force to a flow of the hydraulic fluid directed from the compression-side back-pressure chamber 55 to the cylinder upper chamber 2A.

The compression-side back-pressure chamber 55 is in communication with first pressure-receiving chambers 182 formed between the compression-side pilot case 52 and the sub valve 60 via the passages 62. The first pressure-receiving chambers 182 are each defined in a fan-like form by a plurality of first seat portions 183 provided on the upper-end surface of the compression-side pilot case 52 (the surface thereof opposite from the compression-side main valve 53 side). The passages 62 are opened on the inner sides with respect to the plurality of first seat portions 183, respectively.

A back-pressure introduction passage 181 is provided in the compression-side pilot case 52. In the back-pressure introduction passage 181, a flow of the hydraulic fluid from the cylinder upper chamber 2A to the compression-side back-pressure chamber 55 is generated due to a movement of the piston 3 in an extension direction. An annular seat portion 65 is provided on the lower-end surface of the compression-side pilot case 52 (the surface thereof on the compression-side main valve 53 side). The seat portion 65 defines an annular pressure-receiving chamber 184 provided on the outer periphery of the inner peripheral portion of the bottom portion 57.

A second pressure-receiving chamber 187 isolated from the first pressure-receiving chambers 182 is provided on the upper-end surface of the compression-side pilot case 52. The back-pressure introduction passage 181 is opened to the second pressure-receiving chamber 187. The second pressure-receiving chamber 187 is defined by a second seat portion 188. The second seat portion 188 extends in a circular arc form between a pair of adjacent first pressure-receiving chambers 182. A first orifice 185 is provided on the second seat portion 188. The first orifice 185 establishes communication between the second pressure-receiving chamber 187 and the cylinder upper chamber 2A.

Due to this configuration, a compression-side communication passage (a communication passage) establishing communication between the cylinder upper chamber 2A and the compression-side back-pressure chamber 55 is formed in the compression-side valve mechanism 51. Through the compression-side communication passage, the hydraulic fluid in the cylinder upper chamber 2A is introduced into the compression-side back-pressure chamber 55 via the first orifice 185, the second pressure-receiving chamber 187, the back-pressure introduction passage 181, the pressure-receiving chamber 184, and a check valve 63 according to the movement of the piston 3 in the extension direction.

The valve members constituting the extension-side valve mechanism 21 and the compression-side valve mechanism 51 are pressed between the head portion 7 of the piston bolt 5 and a washer 79 and an axial force is generated thereon by tightening a nut 78 attached to a threaded portion (not labeled) of the shaft portion 6 of the piston bolt 5.

As illustrated in FIG. 2, a common passage 11 is formed in the piston bolt 5. The common passage 11 includes an axial passage 12 formed inside a sleeve 15 (an axial hole). The upper end of the sleeve 15 is fittedly attached in a hole 16 opened on the head portion 7 of the piston bolt 5. The common passage 11 includes an axial passage 13 formed at the lower portion of the hole 16 (a portion on the lower side with respect to the lower end of the sleeve 15). The common passage 11 includes an axial passage 14 constituted by a small-diameter hole opened to the hole 16 at the upper end thereof. The inner diameter of the common passage 11 is maximized at the axial passage 13, and is reducing in an order of the axial passage 12 and the axial passage 14. The axial passage 12 is opened on an end surface 9 of the head portion 7 of the piston bolt 5.

The extension-side back-pressure chamber 25 is in communication with a radial passage 34 formed in the shaft portion 6 of the piston bolt 5 via an orifice (not labeled) provided on the seat portion 35 of the extension-side pilot case 22 and the pressure-receiving chamber 174. The radial passage 34 is in communication with the axial passage 14. The axial passage 14 is in communication with a radial passage 39 formed in the shaft portion 6 of the piston bolt 5.

The radial passage 39 is in communication with the extension-side passage 19 via an annular passage 41 formed at the lower-end portion of the axial hole 4 of the piston 3, a plurality of cutouts 42 formed on the inner peripheral portion of the piston 3, and a disk valve 40 provided on the piston 3. The disk valve 40 is in abutment with an annular seat portion 43 in a seatable and separable manner. The seat portion 43 is provided on the inner peripheral side of the piston 3 with respect to the seat portion 24 and the opening of the extension-side passage 19. The disk valve 40 is a check valve that permits a flow of the hydraulic fluid from the radial passage 39 to the extension-side passage 19.

The compression-side back-pressure chamber 55 is in communication with a radial passage 64 formed in the shaft portion 6 of the piston bolt 5 via an orifice (not labeled) provided on the seat portion 65 of the compression-side pilot case 52, the pressure-receiving chamber 184, an annular passage 68 formed on the inner peripheral portion of the bottom portion 57 of the compression-side pilot case 52, and a width-across-flats portion 77 formed on the shaft portion 6 of the piston bolt 5. The radial passage 64 is in communication with the axial passage 12 via a hole 66 formed on the side wall of the sleeve 15.

The radial passage 64 is in communication with the compression-side passage 20 via the width-across-flats portion 77, an annular passage 71 formed at the upper-end portion of the axial hole 4 of the piston 3, a plurality of cutouts 72 formed on the inner peripheral portion of the piston 3, and a disk valve 70 provided on the piston 3. The disk valve 70 is in abutment with an annular seat portion 73 in a seatable and separable manner. The seat portion 73 is provided on the inner peripheral side of the piston 3 with respect to the seat portion 54 and the opening of the compression-side passage 20. The disk valve 70 is a check valve that permits a flow of the hydraulic fluid from the radial passage 64 to the compression-side passage 20.

A flow of the hydraulic fluid in the common passage 11 is controlled by a pilot valve 81 (a pilot control valve). The pilot valve 81 includes a valve spool 82 and a seat portion 83. The valve spool 82 is slidably provided in the common passage 11. The seat portion 83 is formed on the circumferential edge of the opening of the axial passage 14 at the bottom portion of the hole 16. The valve spool 82 is made of a solid shaft, and includes a slidable portion 84 and a valve body 85. The slidable portion 84 is inserted in the sleeve 15. The valve body 85 is in abutment with the seat portion 83 in a seatable and separable manner.

A head portion 87 of the valve spool 82 is formed at the upper end of the slidable portion 84. A first chamber 130 is formed on the outer periphery of the head portion 7 of the valve spool 82. A spring bearing 88 shaped like an outer flange is formed at the lower-end portion of the head portion 87. The inner peripheral portion of a spring disk 113 is connected to the spring bearing 88. The spring disk 113 biases the valve body 85 in a valve-opening direction. Due to this configuration, the head portion 87 of the valve spool 82 is in abutment with (is pressed against) a lower-end surface 93 of an actuation rod 92 of the solenoid 90.

A bottomed cylindrical cap 121, which is opened at an upper-end side thereof, is attached to the lower portion of the outer peripheral surface of the head portion 7 of the piston bolt 5. An annular seal member 128 seals between the cap 121 and the head portion 7 of the piston bolt 5. Due to that, an annular second chamber 131 is formed between the cap 121 and the head portion 7 of the piston bolt 5. An insertion hole 123 is provided on the cap 121. The shaft portion 6 of the piston bolt 5 is inserted through the insertion hole 123. A plurality of cutouts 124 ("two" cutouts 124 are illustrated in FIG. 2) is provided on the outer periphery of the insertion hole 123. The cutouts 124 are in communication with the width-across-flats portion 77 formed on the shaft portion 6.

A spool back-pressure relief valve 107, a spacer 108, and a retainer 132 are provided between the cap 121 and the head portion 7 of the piston bolt 5 in this order starting from the head portion 7 side. The spool back-pressure relief valve 107, the spacer 108, and the retainer 132 are provided in the second chamber 131. The spool back-pressure relief valve 107 is a check valve that permits a flow of the hydraulic fluid from the first chamber 130 to the second chamber 131 via a passage 29 formed in the head portion 7. The edge portion of the outer periphery of the spool back-pressure relief valve 107 is in abutment with an annular seat portion 109 in a seatable and separable manner. The seat portion 109 is formed on the head portion 7 of the piston bolt 5. A plurality of cutouts 133 is provided on the edge portion of the inner periphery of the retainer 132. The plurality of cutouts 133 establishes communication of the second chamber 131 with the width-across-flats portion 77 and the cutouts 124 of the cap 121. A retainer 59 is interposed between the cap 121 and the sub valve 60. The retainer 59 defines a maximum valve-opening amount of the sub valve 60.

A fail-safe valve 111 is constructed in the first chamber 130. The fail-safe valve 111 includes a disk 112 (a valve seat). The spring bearing 88 (a valve body) of the head portion 87 of the valve spool 82 is in abutment with the disk 112 in a seatable and separable manner. The edge portions of the outer peripheries of the disk 112 and the spring disk 113 are held between the head portion 7 of the piston bolt 5 and a core 99 of the solenoid 90.

The valve body 85 of the valve spool 82 is formed into a circular shape having cutouts 86 (only one of them is illustrated in FIG. 2) constituting a width across flats in cross-section along a plane perpendicular to the axis. Then, when a control current to a coil 95 is 0 A (at the time of a failure), the valve spool 82 is moved in a direction for opening the pilot valve 81 (the upward direction in FIG. 2), and the valve body 85 is fitted in the axial passage 12. As a result, a pair of orifices 114 (only one of them is illustrated in FIG. 2) establishing communication between the axial passages 12 and 13 is formed between the valve body 85 and the axial passage 12. Only one surface of the pair of surfaces constituting the width across flats (the cutouts 86) may be formed. In this case, only one orifice 114 is formed.

On the other hand, when power is applied to the coil 95, the valve body 85 of the valve spool 82 is seated on the seat portion 83, and the pilot valve 81 is closed. With the pilot valve 81 in a closed state, in the valve spool 82, the valve body 85 receives a pressure on the axial passage 14 side over a circular pressure-receiving surface having an area equal to the opening area of the axial passage 14, while the slidable portion 84 receives a pressure on the axial passage 12 side over an annular pressure-receiving surface having an area equal to an area calculated by subtracting the cross-sectional area of a neck portion (not labeled) of the valve body 85 from the cross-sectional area of the slidable portion 84. Now, the valve-opening pressure of the pilot valve 81 can be adjusted by controlling the power supply to the coil 95. At the time of a soft mode in which power is supplied to the coil 95 with a low current value, the biasing force of the spring disk 113 and the thrust force generated by a plunger 96 are balanced, and the valve body 85 is kept in a state of being separated from the seat portion 83 by a predetermined distance.

The solenoid 90 includes a solenoid mechanism portion 91, a solenoid case 191, and the coil 95 (an armature coil). The solenoid mechanism portion 91 includes the actuation rod 92, the plunger 96 (an armature) fixed to the outer periphery of the actuation rod 92, and the vertically divided cores 98 and 99. The cores 98 and 99 are held coaxially at a predetermined vertical interval using vertically divided holders 104 and 105. The actuation rod 92 is guided vertically (axially) by a bush 100 attached in a cover core member 106 and a bush 110 attached to the core 99. Further, a rod inner passage 97 is formed inside the actuation rod 92.

A seal member 116 seals between the lower-end portion of the bottomed cylindrical solenoid case 191 and the core 99. Due to this configuration, an annular passage 117 is formed among the piston bolt 5, the solenoid case 191, and the core 99. The annular passage 117 is in communication with the cylinder upper chamber 2A via a passage 118 provided in the cylindrical portion 8 of the piston bolt 5. A spool back-pressure chamber 101 is formed inside the core 99 of the solenoid 90. The spool back-pressure chamber 101 is in communication with a rod back-pressure chamber 103 via a cutout (not labeled) of the actuation rod 92 and the rod inner passage 97.

The lower-end portion 143 (the one-end portion) of the piston rod 141 is joined to the bottom portion 192 (the upper-end portion) of the solenoid case 191 by plastic flow. In other words, the lower-end portion 143 of the piston rod 141 is coupled with the piston 3 via the solenoid case 191 and the piston bolt 5. A bump stopper 120 attached to the piston rod 141 is placed in abutment with the upper-end surface 193 of the solenoid case 191.

As illustrated in FIG. 1, the piston rod 141 is inserted through a rod guide 135 and an oil seal 134 attached to the opening portions of the cylinder 2 and the outer tube 10 on the upper-end sides. A cover 136 is attached to the outer periphery of the piston rod 141. The cover 136 covers the upper-end side of the outer tube 10. The piston rod 141 is made of a hollow shaft in which a hollow portion 142 extending along the axis is formed.

As illustrated in FIG. 2, a cable 161 is inserted through the hollow portion 142 of the piston rod 141. Electric wires 163 and 164 of the cable 161 on a protrusion side thereof from a lower-end surface 144 of the piston rod 141 (the piston 3 side) are connected to terminals 167 and 168 of the solenoid 90, respectively. The terminal 167 is connected to a positive terminal of the coil 95, and the terminal 168 is connected to a negative terminal of the coil 95.

Next, a flow of the hydraulic oil in the above-described shock absorber 1 will be described. During the extension stroke, the hydraulic fluid in the cylinder upper chamber 2A is introduced into the extension-side back-pressure chamber 25 via an upstream-side back-pressure introduction passage, i.e., the extension-side passage 19, an orifice (not labeled) formed on the disk valve 40, the cutouts 42 formed on the piston 3, the annular passage 41 formed in the axial hole 4 of the piston 3, the radial passage 34, the axial passage 14, the radial passage 39, the annular passage 38 formed in the extension-side pilot case 22, and the check valve 33.

Further, during the extension stroke, the hydraulic fluid in the cylinder upper chamber 2A (a chamber on an upstream side) is introduced into the compression-side back-pressure chamber 55 via the compression-side communication passage, i.e., the first orifice 185, the second pressure-receiving chamber 187, the back-pressure introduction passage 181, and the check valve 63. As a result, the compression-side main valve 53 is prevented from being opened under the pressure in the cylinder upper chamber 2A during the extension stroke.

The hydraulic fluid introduced into the compression-side back-pressure chamber 55 during the extension stroke flows to the cylinder lower chamber 2B (a chamber on a downstream side) via the orifice (not labeled) formed on the seat portion 65, the pressure-receiving chamber 184, the annular passage 68 formed on the inner peripheral portion of the bottom portion 57 of the compression-side pilot case 52, the width-across-flats portion 77 formed on the shaft portion 6 of the piston bolt 5, the cutouts 72 formed on the inner peripheral portion of the piston 3, the disk valve 70, and the compression-side passage 20, and therefore a damping force according to an orifice characteristic due to the orifice 67 and a valve characteristic due to the disk 70 can be acquired before the extension-side main valve 23 is opened, i.e., in a region where the piston speed is a low speed.

On the other hand, during the compression stroke, the hydraulic fluid in the cylinder lower chamber 2B (the chamber on the upstream side) is introduced into the compression-side back-pressure chamber 55 via an upstream-side back-pressure introduction passage, i.e., the compression-side passage 20, an orifice (not labeled) formed on the disk valve 70, the cutouts 72 formed on the piston 3, the annular passage 71 formed in the axial hole 4 of the piston 3, the width-across-flats portion 77 formed on the shaft portion 6 of the piston bolt 5, the annular passage 68 formed in the compression-side pilot case 52, and the check valve 63.

Further, during the compression stroke, the hydraulic fluid in the cylinder lower chamber 2B (the chamber on the upstream side) is introduced into the extension-side back-pressure chamber 25 via the extension-side communication passage, i.e., the first orifice 175, the second pressure-receiving chamber 177, the back-pressure introduction passage 171 (a downstream-side back-pressure introduction passage), and the check valve 33. As a result, the extension-side main valve 23 can be prevented from being opened under the pressure in the cylinder lower chamber 2B during the compression stroke.

The hydraulic fluid introduced into the extension-side back-pressure chamber 25 during the compression stroke flows to the cylinder upper chamber 2A (the chamber on the downstream side) via the orifice (not labeled) formed on the seat portion 35, the pressure-receiving chamber 174, the annular passage 38 formed on the inner peripheral portion of the bottom portion 27 of the extension-side pilot case 22, the radial passage 39, the axial passage 14, the radial passage 34, the annular passage 41 formed in the axial hole 4 of the piston 3, the cutouts 42 formed on the inner peripheral portion of the piston 3, the disk valve 40, and the extension-side passage 19, and therefore a damping force according to an orifice characteristic due to the orifice (not labeled) provided on the seat portion 35 and a valve characteristic due to the disk 40 can be acquired before the compression-side main valve 53 is opened, i.e., in the region where the piston speed is a low speed.

Figure 3:
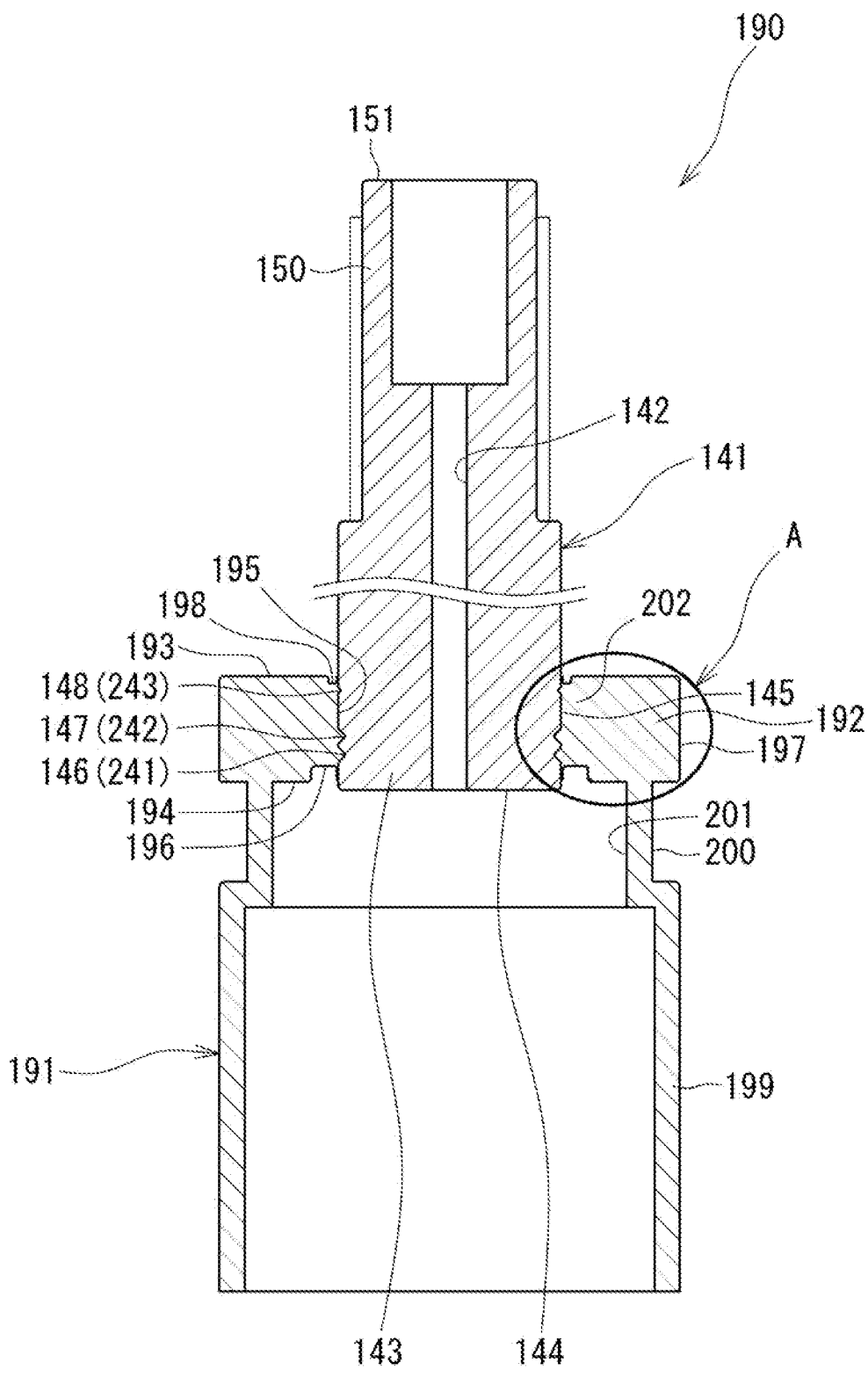
FIG. 3 is a cross-sectional view of a joined body taken along the axial plane.
Figure 4:
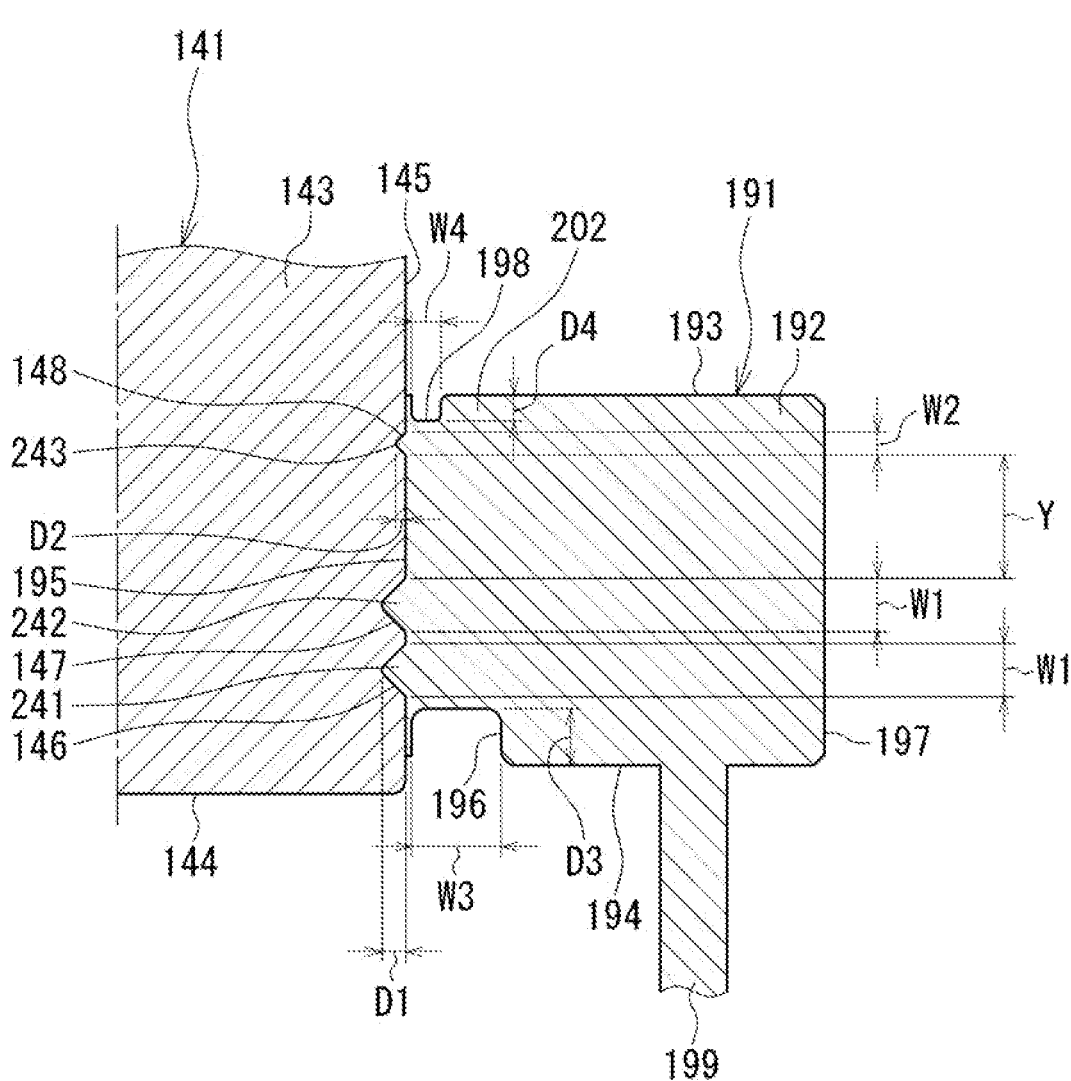
FIG. 4 is an enlarged view of an A portion illustrated in FIG. 3.

FIG. 3 illustrates a joined body 190 of the piston rod 141 (the rod-like member) and the solenoid case 191 (a counterpart member). Further, FIG. 4 is an enlarged view of an A portion illustrated in FIG. 3. The joined body 190 is manufactured by fitting the lower-end portion 143 (the one-end portion) of the piston rod 141 into a fitting hole 195 formed on the bottom portion 192 of the solenoid case 191 of the piston mechanism 140 and locally pressing the solenoid case 191, thereby causing the material of the solenoid case 191 to plastically flow into first annular grooves 146 and 147 and a second annular groove 148 provided on an outer peripheral surface 145 of the lower-end portion 143 of the piston rod 141.

As illustrated in FIG. 4, the two first annular groove 146 and 147 V-shaped in cross-section are provided on the lower-end side (a one-end side) of the outer peripheral surface 145 of the lower-end portion 143 of the piston rod 141. The first annular groove 147 is located axially right above the first annular groove 146, and has the same width W1 in the axial direction (the "vertical direction" in FIG. 4) and the same depth D1 in the radial direction (the "horizontal direction" in FIG. 4) as the first annular groove 146. On the other hand, the second annular groove 148 is provided at a position axially upward spaced apart from the first annular groove 147 by a distance Y on the outer peripheral surface 145 of the lower-end portion 143 of the piston rod 141. The second annular groove 148 has a width W2 smaller than the width W1 of the first annular grooves 146 and 147, and a depth D2.

On the other hand, a first annular recessed portion 196 (a first recessed portion) is provided on the lower-end surface 194 of the bottom portion 192 of the solenoid case 191. The first annular recessed portion 196 is formed near the first annular groove 146 of the piston rod 141 and is shaped like a channel in cross-section. On the other hand, a second annular recessed portion 198 is provided on the upper-end surface 193 of the bottom portion 192 of the solenoid case 191. The second annular recessed portion 198 is formed near the second annular groove 148 of the piston rod 141 and is shaped like a channel in cross-section. A radial width W3 and an axial depth D3 of the first annular recessed portion 196 are greater than a radial width W4 and an axial depth D4 of the second annular recessed portion 198. Accordingly, the volume (capacity) of the first annular recessed portion 196 is larger than the volume of the second annular recessed portion 198.

In the first embodiment, a relationship of W2≤0.7×W1 is established between the width W1 of the first annular grooves 146 and 147 and the width W2 of the second annular groove 148. Further, a relationship of Y≥2×W1 is established between the axial distance Y of the first annular groove 147 and the second annular groove 148 and the width W1 of the first annular grooves 146 and 147. Further, the material of the solenoid case 191 (the counterpart member) is made of metal softer than the material of the piston rod 141 (the rod-like member). For example, the material of the piston rod 141 is carbon steel for machine structural use S45C, and the material of the solenoid case 191 is carbon steel for machine structural use S10C (free-cutting steel).

Figure 5:
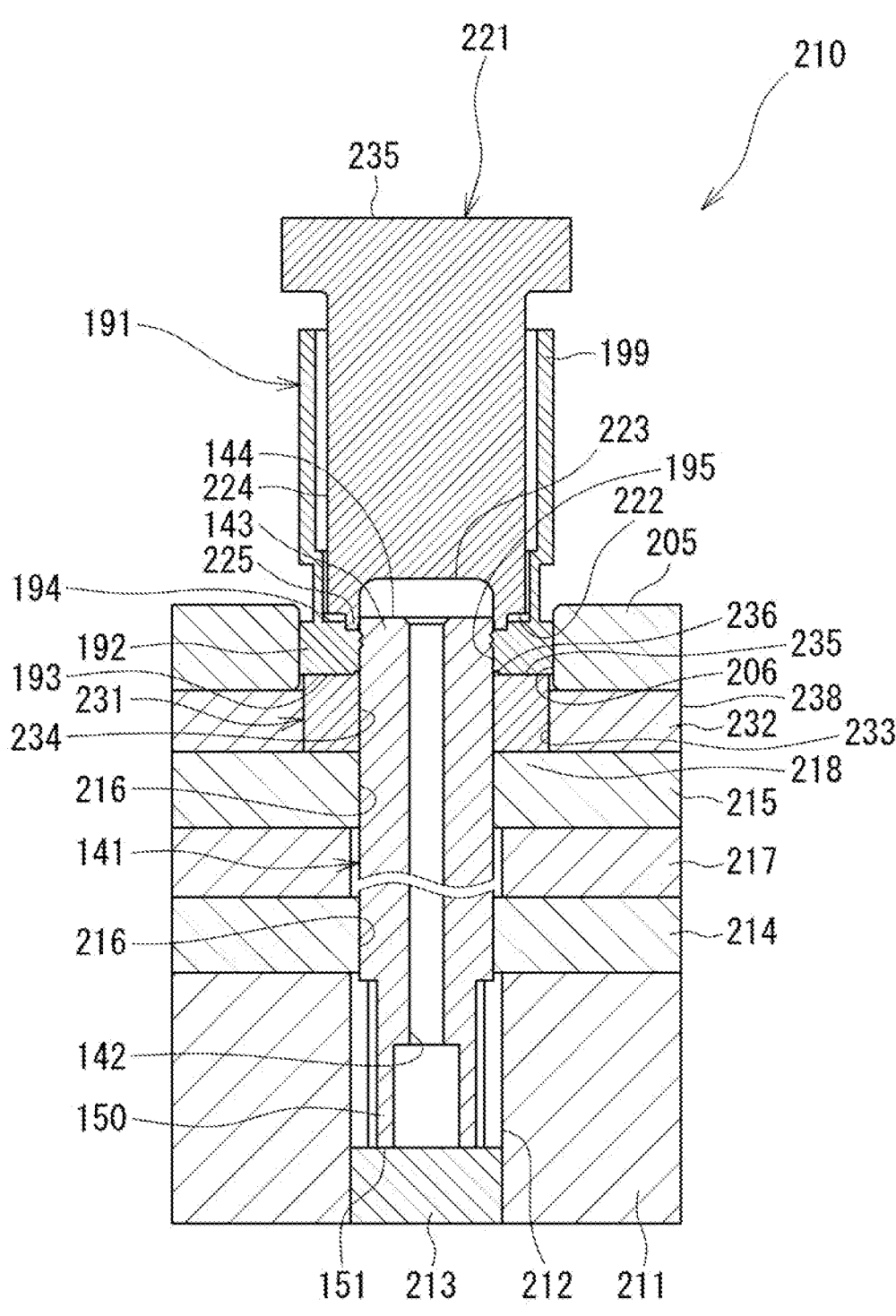
FIG. 5 is a cross-sectional view of a joining apparatus taken along the axial plane with the joined body set thereon.

FIG. 5 is a conceptual diagram (a cross-sectional view taken along the axial plane) illustrating a joining apparatus 210 (pressing type) used for the method of manufacturing the joined body 190 according to the first embodiment with the piston rod 141 (the rod-like member) and the solenoid case 191 (the counterpart member) set thereon. The joining apparatus 210 includes a base block 211 fixed to a bolster (not illustrated) of a pressing device. A hole 212 is provided at the center of the base block 211. An upper-end portion 150 of the piston rod 141 is inserted through the hole 212. A support tool 213 is inserted in the hole 212. The support tool 213 receives an upper-end surface 151 of the piston rod 141, i.e., an axial component of a pressing force generated due to the plastic flow joining method.

A pair of rings 214 and 215 is provided above the support tool 213. The rings 214 and 215 are arranged at an interval in the axial direction (the "vertical direction" in FIG. 5) therebetween. The rings 214 and 215 are formed using a material softer than the material of the piston rod 141 ("S45C" in the present embodiment). Centering holes 216 and 216 are provided to the rings 214 and 215, respectively. The centering holes 216 and 216 are used to center the piston rod 141. A spacer 217 is provided between the pair of rings 214 and 215. The spacer 217 is used to adjust the interval between the rings 214 and 215. FIG. 5 illustrates only one spacer 217, but a plurality of spacers 217 may be stacked. Further, as the rings 214 and 215, three or more rings may be provided as necessary.

A second punch 231 is provided on an inner peripheral portion 218 of the ring 215. The second punch 231 is inserted in a punch attachment hole 233 of a punch holder 232 provided on the ring 215. A rod insertion hole 234 is provided to the second punch 232. The lower-end portion 143 of the piston rod 141 is inserted through the rod insertion hole 234. A predetermined clearance C2 (refer to FIG. 8) is provided between the rod insertion hole 234 of the second punch 231 and the lower-end portion 143 of the piston rod 141.

Figure 6:
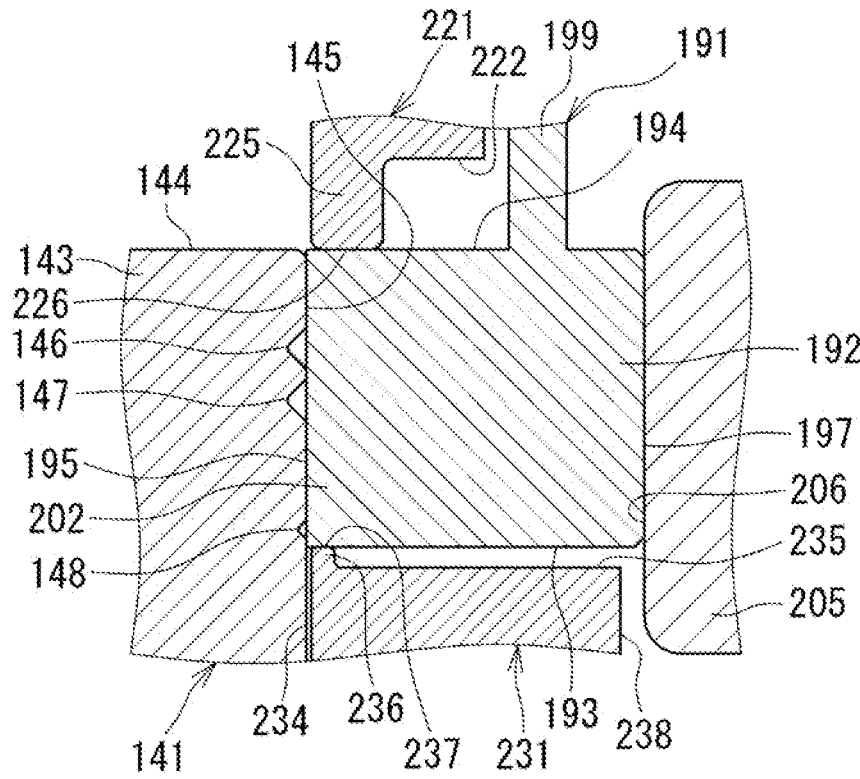
FIG. 6 illustrates a manufacturing method according to the first embodiment, and illustrates it in a state before pressing.

As illustrated in FIG. 6, a second annular protrusion portion 236 is formed on the circumferential edge of the opening of the rod insertion hole 234 on an upper-end surface 235 of the second punch 231. The second annular protrusion portion 236 locally presses the circumferential edge portion of the opening of the fitted hole 195 on the upper-end surface 193 of the bottom portion 192 of the solenoid case 191. As illustrated in FIG. 5, a restraining tool 205 is provided on the punch holder 232. A restraining hole 206, which restrains an outer peripheral surface 197 of the bottom portion 192 of the solenoid case 191, is formed on the restraining tool 205. A predetermined clearance (not labeled) larger than the clearance C2 is provided between the restraining hole 206 of the restraining tool 205 and the outer peripheral surface 238 of the second punch 231.

A first punch 221 is provided above the second punch 231. The first punch 221 is attached to a slider (not illustrated) of the pressing device via a punch holder. A recessed portion 223 is provided at the center of a lower-end surface 222 of the first punch 221. The lower-end portion 143 of the piston rod 141 is inserted in the recessed portion 223. A first annular protrusion portion 225 is formed on the circumferential edge of the opening of the recessed portion 223 on the lower-end surface 222 of the first punch 221. The first annular protrusion portion 225 locally presses the circumferential edge portion of the opening of the fitted hole 195 on the lower-end surface 194 of the bottom portion 192 of the solenoid case 191.

A predetermined clearance C1 (refer to FIG. 8) is provided between the first annular recessed portion 225 and the recessed portion 223 of the first punch 221, and the outer peripheral surface 145 of the lower-end portion 143 of the piston rod 141. A clearance (not labeled) larger than the clearance C1 is provided between an outer peripheral surface 224 of the first punch 221 and an inner peripheral surface 201 of a reduced-diameter portion 200 of the cylindrical portion 199 of the solenoid case 191.

Next, the operation of the above-described joining apparatus 210 will be described.

Now, FIG. 6 illustrates the joining apparatus 210 before the pressing device starts the pressing. In this state, the lower-end portion 143 (the one-end portion) of the piston rod 141 (the rod-like member) is fitted in the fitted hole 195 of the bottom portion 192 of the solenoid case 191 (the counterpart member), and the bottom portion 192 of the solenoid case 191 is fitted in the restraining hole 206 of the restraining tool 205 of the joining apparatus 210. Further, a distal-end surface 226 of the first annular protrusion portion 225 of the first punch 221 is placed in abutment near the first annular groove 147 on the lower-end surface 194 of the bottom portion 192 of the solenoid case 191, and a distal-end surface 237 of the second annular protrusion portion 236 of the second punch 231 is placed in abutment near the second annular groove 148 on the upper-end surface 193 of the bottom portion 192 of the solenoid case 191.

Figure 7:
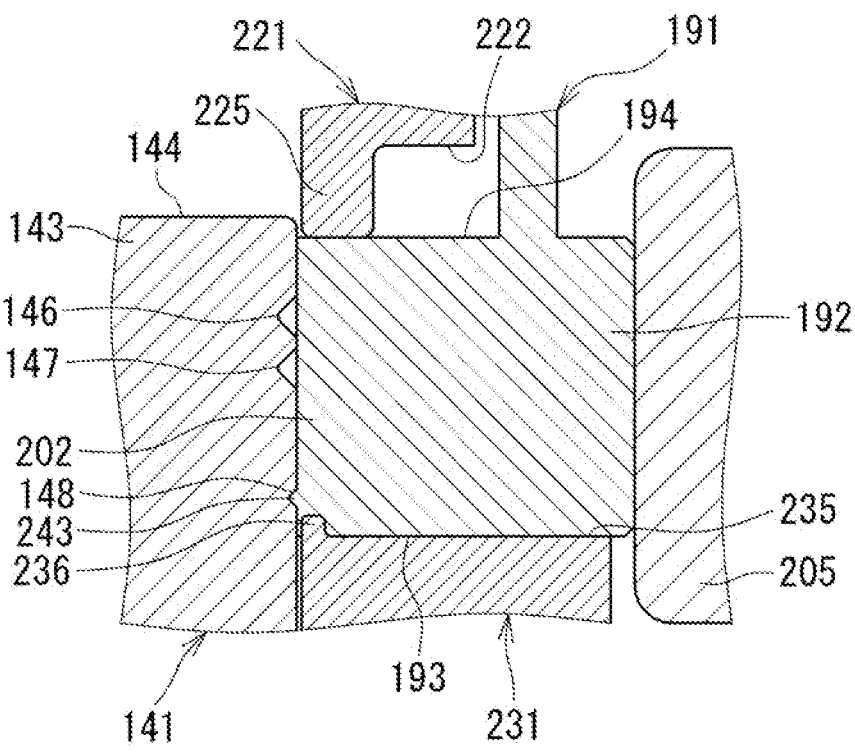
FIG. 7 illustrates the manufacturing method according to the first embodiment, and illustrates it with a second joined portion formed.

The inner peripheral portion 202 of the bottom portion 192 of the solenoid case 191 is locally pressed by the first annular protrusion portion 225 of the first punch 221 and the second annular protrusion portion 236 of the second punch 231 by lowering the first punch 221 from the state illustrated in FIG. 6. Based on the Tresca yield condition, first, the material of a portion of the solenoid case 191 that faces the second annular groove 148 is deformed (plastically flows) so as to be introduced into the second annular groove 148. As a result, as illustrated in FIG. 7, an annular second joined portion 243 is formed at the moment that the second annular groove 148 is filled with the material of the solenoid case 191 and the upper-end surface 235 of the second punch 231 is brought into contact with the upper-end surface 193 of the bottom portion 192 of the solenoid case 191.

Figure 8:
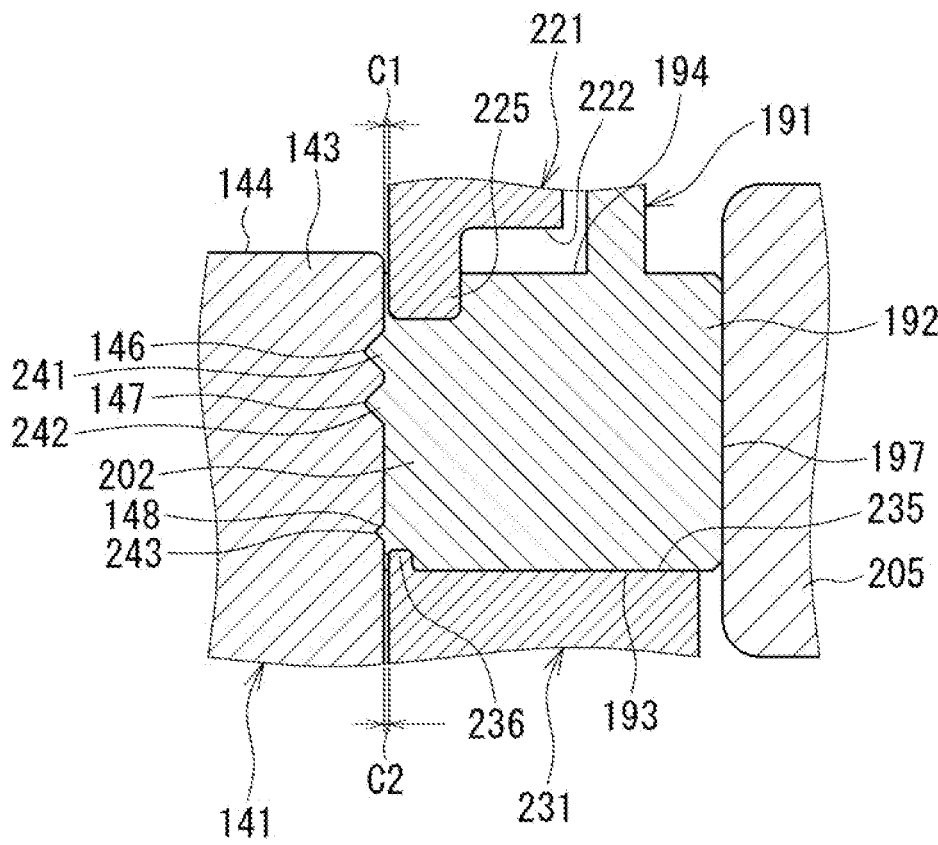
FIG. 8 illustrates the manufacturing method according to the first embodiment, and illustrates it with first joined portions formed.

When the upper-end surface 235 of the second punch 231 is brought into contact with the upper-end surface 193 of the bottom portion 192 of the solenoid case 191, next, the material of a portion of the solenoid case 191 that faces the first annular grooves 146 and 147 is deformed (plastically flows) so as to be introduced into the first annular grooves 146 and 147. As a result, as illustrated in FIG. 8, the first annular grooves 146 and 147 are filled with the material of the solenoid case 191, and annular first joined portions 241 and 242 are formed. At this moment, the pressing by the pressing device is completed.

In this manner, in the first embodiment, the solenoid case 191 (the counterpart member) is locally pressed by the first punch 221 and the second punch 231, whereby the first joined portions 241 and 242 are formed with the first annular grooves 146 and 147 filled with the material of the solenoid case 191 after the second joined portion 243 is formed with the second annular groove 148 filled with the material of the solenoid case 191 with the aid of the plastic flow.

This allows a load (a pressing force) applied to the piston rod 141 (the rod-like member) to be partially received by the second joined portion 243 when the material of the solenoid case 191 flows into the first annular grooves 146 and 147 due to the pressing by the first annular protrusion portion 225 of the first punch 221, thereby contributing to reducing a reaction force that the upper-end portion 150 (the upper-end surface 151) of the piston rod 141 receives from the support tool 213 of the joining apparatus 210 (hereinafter referred to as a "reaction force received by the piston rod 141").

Figure 9:
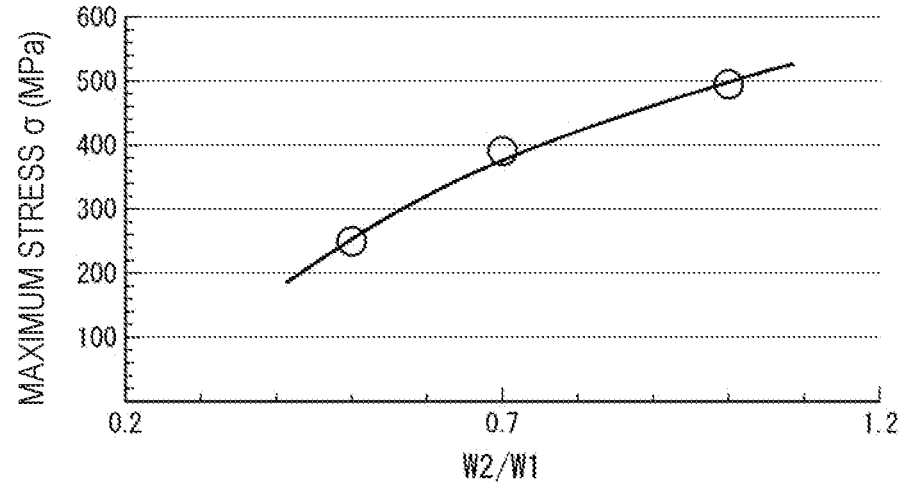
FIG. 9 illustrates a result of an experiment for deriving a condition for reducing a reaction force received by a piston rod (a rod-like member).

Then, the inventor of the present invention studied a condition for effectively reducing the reaction force received by the piston rod 141 (the rod-like member) by conducting an experiment himself. FIG. 9 illustrates a result of this experiment. In FIG. 9, the horizontal axis represents a value acquired by dividing the width W2 (the depth) of the second annular groove 148 by the width W1 (the depth) of the first annular grooves 146 and 147 (hereinafter referred to as a "value of W2/W1"), and the vertical axis represents a maximum stress σ (MPa) applied to the upper-end portion 150 of the piston rod 141.

In the present experiment, the axial distance Y between the first annular groove 147 and the second annular groove 148 (refer to FIG. 4) and the width W1 of the first annular grooves 146 and 147 were set to Y=2.4×W1. Further, the width W3 of the first annular recessed portion 196 and the width W4 of the second annular recessed portion 198 were set to W3=2.0×W4.

Referring to FIG. 9, when the value of W2/W1 was 1.0, the maximum stress σ applied to the upper-end portion 150 of the piston rod 141 was approximately 500 (MPa) Δt this time, deformation occurred on the upper-end portion 150 of the piston rod 141, because the yield point of S45C, which was the material of the piston rod 141 (the rod-like member), was approximately 450 (MPa). In light thereof, the inventor of the present invention determined based on the result of the experiment illustrated in FIG. 9 that a condition causing no deformation on the upper-end portion 150 of the piston rod 141, i.e., a preferable condition for reducing the reaction force received by the piston rod 141 was the value of W2/W1 equal to or smaller than 0.7.

Then, in the conventional joining method, the processing force (the pressing force exerted by the first punch and the second punch) applied to the piston rod is received by the upper-end portion (an opposite-end portion) of the piston rod when the lower-end portion (the one-end portion) of the piston rod (the rod-like member) and the bottom portion of the solenoid case (the counterpart member) are joined by the plastic flow joining method, and therefore the circumferential edge portion of the opening of the upper-end portion of the piston rod (a pressure-receiving portion) may be deformed due to the axial component of the processing force applied to the piston rod in the case where a hollow portion (a cable insertion hole) is provided in the piston rod.

On the other hand, in the first embodiment, the first annular grooves 146 and 147 (a first groove) are provided on the lower-end side (the one-end side) of the lower-end portion 143 (the one-end portion) of the piston rod 141 and the second annular groove 148 (a second groove) is provided at the position spaced apart from these first annular grooves 146 and 147 toward the axial upper-end side, and the width W1 and the depth D1 of the first annular grooves 146 and 147 are set to larger values than the width W2 and the depth D2 of the second annular groove 148.

According to this first embodiment, the solenoid case 191 (the counterpart member) is locally pressed by the first annular protrusion portion 225 of first punch 221 and the second annular protrusion portion 236 of the second punch 231, whereby the first joined portions 241 and 242 are formed with the first annular grooves 146 and 147 filled with the material of the solenoid case 191 after the second joined portion 243 is formed with the second annular groove 148 filled with the material of the solenoid case 191 with the aid of the plastic flow.

Therefore, when the material of the solenoid case 191 flows into the first annular grooves 146 and 147 due to the pressing by the first annular protrusion portion 225 of the first punch 221, the load (the axial component of the processing force) applied to the piston rod 141 (the rod-like member) can be partially received by the second joined portion 243. As a result, the first embodiment can reduce the reaction force received by the piston rod 141, thereby preventing the deformation of the upper-end portion 150 (the circumferential edge portion of the opening on the opposite-end side) of the piston rod 141.

Further, in the first embodiment, the predetermined clearance C1 is provided between the first annular protrusion portion 255 and the recessed portion 223 of the first punch 221 and the outer peripheral surface 145 of the lower-end portion 143 of the piston rod 141, and the predetermined clearance C2 is also provided between the rod insertion hole 234 of the second punch 231 and the outer peripheral surface 145 of the lower-end portion 143 of the piston rod 141. Further, a softer material than the material of the piston rod 141 is used for the rings 214 and 215. Therefore, the piston rod 141 can be prevented from incurring damage on the sliding surface thereof.

Further, the first embodiment eliminates the necessity of providing the bottom portion 192 of the solenoid case 191 (the counterpart member) with a flange portion (an inner flange) that receives the lower-end portion 143 (the lower-end surface 14) of the piston rod 141 (the rod-like member) unlike the conventional joining method, thereby allowing the joined body 109 to have a shorter axial length and thus the shock absorber 1 to have a smaller size by an amount corresponding to the thickness of the flange portion.

The first embodiment is not limited to the above-described configuration, and, for example, can be configured in the following manner.

The first annular grooves 146 and 147 and the first joined portions 241 and 242 are provided on the lower-end surface 144 side of the lower-end portion 143 of the piston rod 141 (the rod-like member) and the second annular groove 148 and the second joined portion 243 are provided at a position spaced apart from the first annular grooves 146 and 147 and the first joined portions 241 and 242 to the axially upper-end side in the first embodiment. However, the first embodiment may be configured in such a manner that the second annular groove 148 and the second joined portion 243 are provided on the lower-end surface 144 side of the lower-end portion 143 of the piston rod 141 (the rod-like member), and the first annular grooves 146 and 147 and the first joined portions 241 and 242 are provided at positions spaced apart from the second annular groove 148 and the second joined portion 243 to the axially upper-end side.

In this case, the joining apparatus 210 is constructed by providing the second annular proportion portion 236 on the lower-end surface 222 of the first punch 221 and the first annular protrusion portion 225 on the upper-end surface 235 of the second punch 231.

Figure 11:
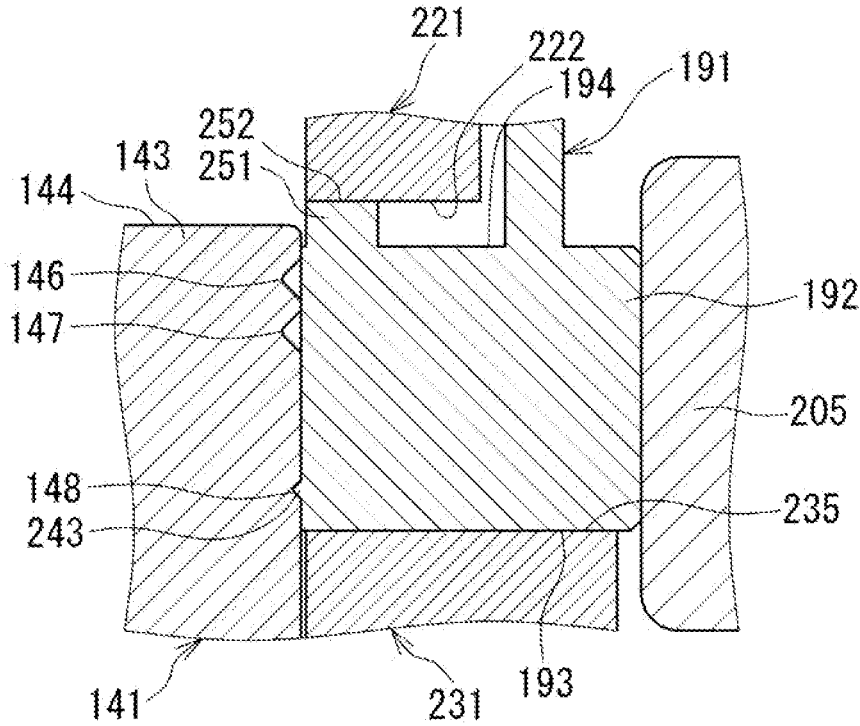
FIG. 11 illustrates the manufacturing method according to the second embodiment, and illustrates it with the second joined portion formed.
Figure 12:
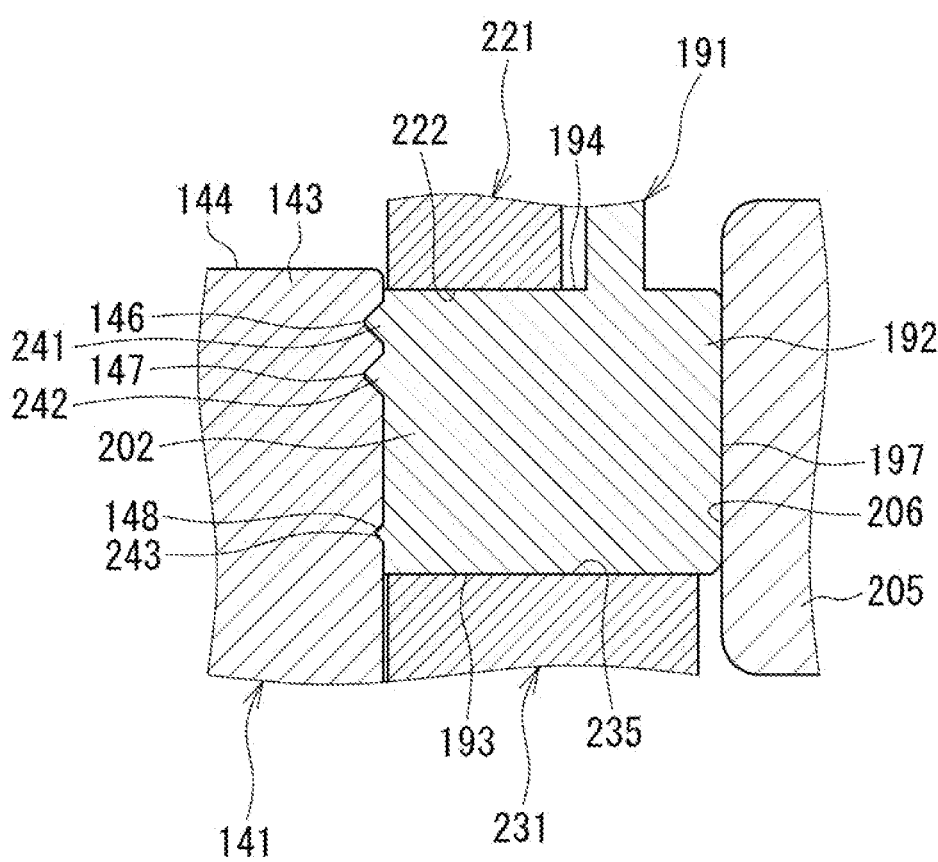
FIG. 12 illustrates the manufacturing method according to the second embodiment, and illustrates it with the first joined portions formed.

(Second Embodiment) Next, a second embodiment will be described with reference to FIGS. 10 to 12.

The second embodiment will be described, assigning the same names and reference numerals to portions shared with the first embodiment, and omitting redundant descriptions thereof.

In the above-described first embodiment, the solenoid case 191 (the counterpart member) is locally pressed by the first annular protrusion portion 225 of first punch 221 and the second annular protrusion portion 236 of the second punch 231, and the first annular grooves 146 and 147 are filled with the material of the solenoid case 191 and the first joined portions 241 and 242 are formed after the second annular groove 148 is filled with the material of the solenoid case 191 and the second joined portion 243 is formed.

Figure 10:
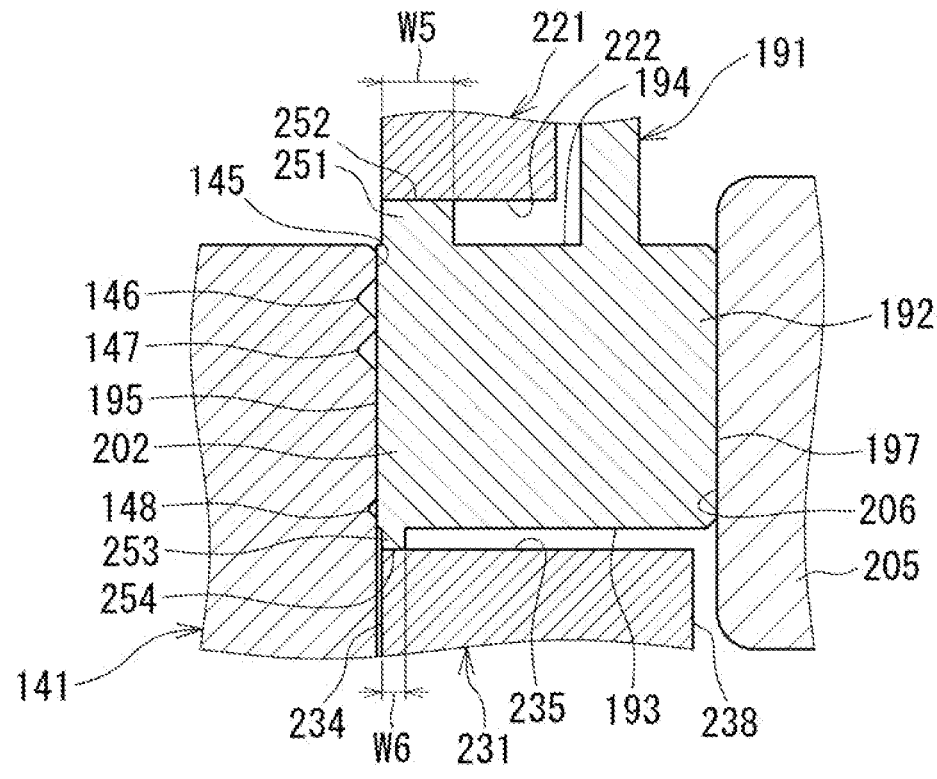
FIG. 10 illustrates a manufacturing method according to a second embodiment, and illustrates it in a state before pressing.

On the other hand, in the second embodiment, as illustrated in FIG. 10, a first annular protrusion portion 251 is provided on the circumferential edge of the opening of the fitted hole 195 on the upper-end surface 193 of the bottom portion 192 of the solenoid case 191, and a second annular protrusion portion 253 is also provided on the circumferential edge of the opening of the fitted hole 195 on the lower-end surface 194 of the bottom portion 192 of the solenoid case 191. Then, the first annular protrusion portion 251 of the solenoid case 191 is pressed by the flat lower-end surface 222 of the first punch 221, and the second annular protrusion portion 253 of the solenoid case 191 is also pressed by the flat upper-end surface 235 of the second punch 231.

A width W5 of the first annular protrusion portion 251 of the solenoid case 191 is similar to the width W3 (refer to FIG. 4) of the first recessed protrusion portion 196 formed on the solenoid case 191 of the joined body 190 in the first embodiment, and a width W6 of the second annular protrusion portion 253 of the solenoid case 191 is similar to the width W4 (refer to FIG. 4) of the second annular recessed portion 198 formed on the solenoid case 191 of the joined body 190 in the first embodiment. Further, the volume of the first annular protrusion portion 251 is larger than the volume of the second annular protrusion portion 253.

In the second embodiment, based on the Tresca yield condition, first, the material of the portion of the solenoid case 191 that faces the second annular groove 148 is deformed (plastically flows) so as to be introduced into the second annular groove 148 under the pressing force of the second punch 231 via the second annular protrusion portion 253. As a result, as illustrated in FIG. 11, the annular second joined portion 243 is formed at the moment that the second annular groove 148 is filled with the material of the solenoid case 191 and the upper-end surface 235 of the second punch 231 is brought into contact with the upper-end surface 193 of the bottom portion 192 of the solenoid case 191.

When the upper-end surface 235 of the second punch 231 is brought into contact with the upper-end surface 193 of the bottom portion 192 of the solenoid case 191, next, the material of the portion of the solenoid case 191 that faces the first annular grooves 146 and 147 is deformed (plastically flows) so as to be introduced into the first annular grooves 146 and 147 under the pressing force of the first punch 221 via the first annular protrusion portion 251. As a result, as illustrated in FIG. 12, the annular first joined portions 241 and 242 are formed at the moment that the first annular grooves 146 and 147 are filled with the material of the solenoid case 191 and the lower-end surface 222 of the first punch 221 is brought into contact with the lower-end surface 194 of the bottom portion 192 of the solenoid case 191.

According to the second embodiment, advantageous effects similar to the above-described first embodiment can be achieved.

The second embodiment is not limited to the above-described configuration, and, for example, can be configured in the following manner.

The first annular protrusion portion 251 is provided on the upper-end surface 193 of the bottom portion 192 of the solenoid case 191 and the second annular protrusion portion 253 is also provided on the lower-end surface 194 of the bottom portion 192 of the solenoid case 191 in the second embodiment, but the second embodiment can also be established by providing any one of the first annular protrusion portion 251 and the second annular protrusion portion 253 alone.

For example, in a case where only the first annular protrusion portion 251 is provided, the second annular protrusion portion 236 is provided on the upper-end surface 235 of the second punch 231. On the other hand, in a case where only the second annular protrusion portion 253 is provided, the first annular protrusion portion 225 is provided on the lower-end surface 222 of the second punch 221.

Further, the second embodiment may be configured in such a manner that the second annular groove 148 and the second joined portion 243 are provided on the lower-end surface 144 side of the lower-end portion 143 of the piston rod 141 (the rod-like member), and the first annular grooves 146 and 147 and the first joined portions 241 and 242 are provided at positions spaced apart from the second annular groove 148 and the second joined portion 243 to the axially upper-end side, similarly to the first embodiment.

The present invention shall not be limited to the above-described embodiments, and includes various modifications. For example, the above-described embodiments have been described in detail to facilitate a better understanding of the present invention, and the present invention shall not necessarily be limited to the configuration including all of the described features. Further, a part of the configuration of some embodiment can be replaced with the configuration of another embodiment. Further, some embodiment can also be implemented with a configuration of another embodiment added to the configuration of this embodiment. Further, each embodiment can also be implemented with another configuration added, deleted, or replaced with respect to a part of the configuration of this embodiment.

The present application claims priority under the Paris Convention to Japanese Patent Application No. 2021-131258 filed on Aug. 11, 2021. The entire disclosure of Japanese Patent Application No. 2021-131258 filed on Aug. 11, 2021 including the specification, the claims, the drawings, and the abstract is incorporated herein by reference in its entirety.

REFERENCE SIGNS LIST 141 piston rod (rod-like member)
143 lower-end portion (one-end portion of the piston rod)
146, 147 first annular groove (first groove)
148 second annular groove (second groove)
191 solenoid case (counterpart member)
195 fitted hole

The invention claimed is:

1. A joined body of two members, the joined body comprising:
a rod-like member; and
a counterpart member,
wherein the rod-like member and the counterpart member are joined by fitting a one-end portion of the rod-like member into a fitted hole of the counterpart member and pressing a material of the counterpart member to thus cause the material to plastically flow into a groove provided on a circumferential surface of the rod-like member,
wherein the groove includes a first groove provided on a one-end side of the rod-like member and a second groove provided so as to be axially spaced apart from the first groove, and
wherein a depth of the first groove is greater than a depth of the second groove.

2. The joined body according to claim 1, wherein the first groove includes two grooves and the second groove includes one groove.

3. A joined body of two members, the joined body comprising:
a rod-like member; and
a counterpart member,
wherein the rod-like member and the counterpart member are joined by fitting a one-end portion of the rod-like member into a fitted hole of the counterpart member and pressing a material of the counterpart member to thus cause the material to plastically flow into a groove provided on a circumferential surface of the rod-like member,
wherein the groove includes a plurality of first grooves provided on a one-end side of the rod-like member and a second groove provided so as to be axially spaced apart from the first grooves, the number of second groove(s) is smaller than the number of first grooves,
wherein the counterpart member includes a first recessed portion formed near the first grooves by pressing a surface on one axial side, and a second recessed portion formed near the second groove by pressing a surface on an opposite axial side, and
wherein a volume of the first recessed portion is greater than a volume of the second recessed portion.

4. The joined body according to claim 3, wherein an axial depth of the first recessed portion is greater than an axial depth of the second recessed portion.

5. A method of manufacturing a joined body of two members,
the joined body including a rod-like member and a counterpart member,
the rod-like member and the counterpart member being joined by fitting a one-end portion of the rod-like member into a fitted hole of the counterpart member and pressing a material of the counterpart member to thus cause the material to plastically flow into a groove provided on a circumferential surface of the rod-like member,
the method of manufacturing the joined body comprising:
a first plastic flow step of causing the material of the counterpart member to plastically flow into a second groove provided at a position spaced apart from one end of the rod-like member; and
a second plastic flow step of causing the material of the counterpart member to plastically flow into a first groove including a groove deeper than the second groove provided on a one-end side of the rod-like member.

6. A shock absorber comprising:
a cylinder sealingly containing hydraulic fluid therein;
a piston mechanism partitioning an inside of the cylinder into two chambers;
a piston rod having a one-end portion joined with the piston mechanism and an opposite-end portion extending out of the cylinder; and
a joined portion formed by fitting the one-end portion of the piston rod into a fitted hole of the piston mechanism and pressing a material of the piston mechanism to thus cause the material to plastically flow into a groove provided on a circumferential surface of the piston rod,
wherein the groove includes a first groove provided on a one-end side of the piston rod and a second groove provided so as to be axially spaced apart from the first groove, and
wherein a depth of the first groove is greater than a depth of the second groove.

* * * * *